(12) United States Patent
Walters

(10) Patent No.: US 10,424,415 B2
(45) Date of Patent: Sep. 24, 2019

(54) CERAMIC NUCLEAR FUEL DISPERSED IN A METALLIC ALLOY MATRIX

(71) Applicant: ADVANCED REACTOR CONCEPTS LLC, Reston, VA (US)

(72) Inventor: Leon C. Walters, Idaho Falls, ID (US)

(73) Assignee: Advanced Reactor Concepts LLC, Chevy Chase, MD (US)

( * ) Notice: Subject to any disclaimer, the term of this patent is extended or adjusted under 35 U.S.C. 154(b) by 465 days.

(21) Appl. No.: 14/680,732

(22) Filed: Apr. 7, 2015

(65) Prior Publication Data

US 2015/0294747 A1    Oct. 15, 2015

Related U.S. Application Data

(60) Provisional application No. 61/979,260, filed on Apr. 14, 2014.

(51) Int. Cl.
*G21C 3/64* (2006.01)
*G21C 21/16* (2006.01)
*G21C 19/42* (2006.01)

(52) U.S. Cl.
CPC .............. *G21C 21/16* (2013.01); *G21C 3/64* (2013.01); *G21C 19/42* (2013.01); *Y02E 30/34* (2013.01); *Y02E 30/38* (2013.01)

(58) Field of Classification Search
CPC . G21C 3/02; G21C 21/02; G21C 3/64; G21C 3/62; G21C 3/16
USPC ......................................................... 264/0.5
See application file for complete search history.

(56) References Cited

U.S. PATENT DOCUMENTS

| | | | |
|---|---|---|---|
| 1,565,771 A | 12/1925 | Armstrong | |
| 1,624,704 A | 4/1927 | Adams | |
| 2,894,889 A | 7/1959 | Paine, Jr. | |
| 2,939,803 A * | 6/1960 | Steele | B01J 23/12 376/901 |
| 2,941,933 A * | 6/1960 | Roake | G21C 3/04 228/155 |
| 2,952,056 A | 9/1960 | Shuck | |
| 2,983,663 A | 5/1961 | Bassett | |
| 2,992,179 A | 7/1961 | Bassett | |
| 3,028,330 A * | 4/1962 | Huntington | G21C 3/28 264/0.5 |
| 3,042,594 A | 7/1962 | Hauth | |
| 3,081,249 A * | 3/1963 | Whittemore, Jr. | G21C 3/07 264/0.5 |
| 3,098,024 A | 7/1963 | Barney et al. | |
| 3,158,547 A * | 11/1964 | Smith | B22F 7/06 264/0.5 |
| 3,177,578 A * | 4/1965 | Barr | G21C 3/18 264/0.5 |
| 3,178,354 A | 4/1965 | Vann et al. | |
| 3,180,632 A | 4/1965 | Katz et al. | |
| 3,197,375 A | 7/1965 | Borst | |
| 3,215,608 A | 11/1965 | Guenther | |
| 3,243,352 A | 3/1966 | Boudouresques | |
| 3,261,378 A | 7/1966 | Ayer et al. | |
| 3,322,509 A | 5/1967 | Vogg | |
| 3,328,133 A | 6/1967 | Ishihara et al. | |
| 3,372,213 A | 3/1968 | Nishiyama et al. | |
| 3,404,200 A * | 10/1968 | Burgess | G21C 3/64 264/0.5 |
| 3,409,973 A | 11/1968 | Kilp et al. | |
| 3,413,383 A * | 11/1968 | Yasuo | G21C 21/04 264/0.5 |
| 3,420,738 A | 1/1969 | Grant | |
| 3,432,276 A * | 3/1969 | Reas | C01G 43/066 423/7 |
| 3,442,762 A | 5/1969 | Denton | |
| 3,501,411 A * | 3/1970 | Triggiani | G21C 3/623 252/635 |

(Continued)

FOREIGN PATENT DOCUMENTS

| | | |
|---|---|---|
| CN | 103596646 | 2/2014 |
| EA | 010962 | 12/2008 |

(Continued)

OTHER PUBLICATIONS

Requirement for Restriction/Election in re: U.S. Appl. No. 14/035,392, dated Sep. 6, 2016, 9 pages.
Final Office Action in re: U.S. Appl. No. 14/291,890, dated Aug. 23, 2016, 12 pages.
International Search Report and Written Opinion for related application PCT/US16/14307, dated Apr. 11, 2016.
U.S. Appl. No. 14/035,392, Sep. 24, 2013, Advanced Reactor Concepts LLC.
U.S. Appl. No. 14/291,890, Apr. 9, 2015, Advanced Reactor Concepts LLC.
U.S. Appl. No. 14/682,759, Apr. 9, 2015, Advanced Reactor Concepts LLC.
U.S. Appl. No. 61/182,954, Jun. 1, 2009, Walters.
U.S. Appl. No. 61/294,673, Jan. 13, 2010, Walters.
U.S. Appl. No. 61/306,754, Feb. 22, 2010, Walters.

(Continued)

*Primary Examiner* — Matthew J Daniels
*Assistant Examiner* — Andrew D Graham
(74) *Attorney, Agent, or Firm* — Porzio, Bromberg & Newman P.C.

(57) ABSTRACT

Systems and methods for manufacturing metal fuel are described. Methods for fabricating a metal-fuel-matrix cermet nuclear fuel may include crushed ceramic particles combined with metallic fast reactor fuel via bottom pour casting or injection casting, or a powdered metallurgical process. A maximum quantity of crushed ceramic particles added to the metallic fuel must not exceed that which would fail to yield a continuous matrix of metal fuel. After a short irradiation period, the microstructure of the fuel may be substantially identical to that of injection cast fuel, without crushed ceramic particles, irrespective of the fabrication process. Thus, the extensive existing database for injection cast fuel, without crushed ceramic particles, may be an excellent indicator of expected irradiation performance. Each of the processes may contribute to a solution of the spent nuclear fuel problem and may denature Pu239 during the process.

16 Claims, No Drawings

(56) References Cited

U.S. PATENT DOCUMENTS

| | | |
|---|---|---|
| 3,505,170 A | 4/1970 | Flowers et al. |
| 3,506,235 A | 4/1970 | Katz et al. |
| 3,579,390 A * | 5/1971 | Kaznoff et al. ........... C22C 1/10 264/0.5 |
| 3,660,075 A | 5/1972 | Harbur et al. |
| 3,677,894 A | 7/1972 | Ferrari |
| 3,682,774 A | 8/1972 | Beyer |
| 3,683,975 A | 8/1972 | Sease et al. |
| 3,702,282 A | 11/1972 | Gatley et al. |
| 3,708,393 A | 1/1973 | Waymire et al. |
| 3,712,809 A * | 1/1973 | Bumm et al. ............. B22F 3/15 252/640 |
| 3,778,348 A | 12/1973 | Sease et al. |
| 3,808,320 A | 4/1974 | Kaiser et al. |
| 3,823,067 A | 7/1974 | Stern et al. |
| 3,925,151 A | 12/1975 | Klepfer |
| 3,939,039 A | 2/1976 | Seki et al. |
| 3,969,186 A | 7/1976 | Thompson et al. |
| 4,000,617 A | 1/1977 | Fortescue |
| 4,004,972 A | 1/1977 | Mogard |
| 4,050,638 A | 9/1977 | Ito et al. |
| 4,057,465 A | 11/1977 | Thompson et al. |
| 4,131,511 A | 12/1978 | Mordarski et al. |
| 4,147,590 A | 4/1979 | Szekely |
| 4,225,560 A | 9/1980 | Nakanishi et al. |
| 4,229,942 A | 10/1980 | Gomberg et al. |
| 4,257,846 A | 3/1981 | Pierce |
| 4,257,847 A | 3/1981 | Gibby et al. |
| 4,292,127 A | 9/1981 | Hartley et al. |
| 4,473,410 A | 9/1984 | Grubb et al. |
| RE31,697 E | 10/1984 | Gomberg et al. |
| 4,519,978 A | 5/1985 | Brachet et al. |
| 4,526,741 A | 7/1985 | Cawley et al. |
| 4,548,347 A | 10/1985 | Christiansen et al. |
| 4,610,842 A | 9/1986 | Vannesjo |
| 4,624,828 A | 11/1986 | Alexander |
| 4,687,605 A | 8/1987 | Cellier et al. |
| 4,687,629 A | 8/1987 | Mildrum |
| 4,717,534 A | 1/1988 | Morita |
| 4,759,911 A | 7/1988 | Bingham et al. |
| 4,778,648 A | 10/1988 | Ferrari |
| 4,814,046 A | 3/1989 | Johnson et al. |
| 4,853,177 A | 8/1989 | Pettus |
| H689 H | 10/1989 | Christiansen et al. |
| H000689 H * | 10/1989 | Christiansen et al. ... G21C 3/17 376/361 |
| 4,943,409 A | 7/1990 | Broadley |
| 4,971,753 A | 11/1990 | Taylor, Jr. et al. |
| 4,997,596 A | 3/1991 | Proebstle et al. |
| 5,044,911 A | 9/1991 | Seidel et al. |
| 5,112,534 A | 5/1992 | Guon et al. |
| 5,196,159 A | 3/1993 | Kawashima et al. |
| 5,219,519 A | 6/1993 | Matzner |
| 5,229,067 A | 7/1993 | Hammers |
| 5,257,659 A | 11/1993 | Maag |
| 5,317,611 A | 5/1994 | Petrosky et al. |
| 5,377,246 A | 12/1994 | Taylor, Jr. et al. |
| 5,400,375 A * | 3/1995 | Suzuki ................... G21C 1/024 376/170 |
| 5,419,886 A | 5/1995 | Grantham et al. |
| 5,420,897 A * | 5/1995 | Kasai ...................... G21C 1/02 376/220 |
| 5,446,773 A | 8/1995 | Wakabayashi |
| 5,502,754 A | 3/1996 | Erbes |
| 5,517,541 A | 5/1996 | Rosenbaum et al. |
| 5,519,748 A | 5/1996 | Adamson et al. |
| 5,608,768 A | 3/1997 | Matzner et al. |
| 5,681,404 A | 10/1997 | Adamson et al. |
| 5,711,826 A | 1/1998 | Nordstrom |
| 5,742,653 A | 4/1998 | Erbes et al. |
| 5,828,715 A | 10/1998 | Kurosaki et al. |
| 6,091,791 A | 7/2000 | Matsumoto et al. |
| 6,113,982 A | 9/2000 | Claar et al. |
| 6,233,298 B1 | 5/2001 | Bowman |
| 6,251,310 B1 * | 6/2001 | Song ..................... G21C 21/00 264/0.5 |
| 6,263,038 B1 | 7/2001 | Kantrowitz et al. |
| 6,287,266 B1 | 9/2001 | Sandler et al. |
| 6,297,419 B1 * | 10/2001 | Parkes ................... G03F 7/027 588/10 |
| 6,298,108 B1 | 10/2001 | Farawila |
| 6,343,107 B1 | 1/2002 | Erbes et al. |
| 6,668,034 B2 | 12/2003 | Mahe |
| 6,674,830 B2 | 1/2004 | Kato et al. |
| 6,768,781 B1 | 7/2004 | Moriarty |
| 6,888,910 B1 | 5/2005 | Moriarty |
| 6,909,765 B2 | 6/2005 | Lahoda |
| 7,333,584 B2 | 2/2008 | Kitou et al. |
| 7,445,760 B2 * | 11/2008 | Fukasawa ............... G21C 19/46 423/10 |
| 7,521,007 B1 | 4/2009 | Jarvinen et al. |
| 7,711,079 B2 | 5/2010 | Oh et al. |
| 7,961,835 B2 | 6/2011 | Keller |
| 8,268,204 B2 * | 9/2012 | Rhee ....................... B28B 3/027 264/0.5 |
| 8,535,604 B1 * | 9/2013 | Baker ................... B22F 1/0003 428/546 |
| 8,537,961 B2 | 9/2013 | Keller |
| 8,571,167 B2 | 10/2013 | Walters |
| 8,767,902 B2 | 7/2014 | Walters |
| 9,008,259 B2 | 4/2015 | Walters |
| 2001/0007584 A1 | 7/2001 | Adamson et al. |
| 2002/0052559 A1 | 5/2002 | Watrous |
| 2002/0117093 A1 | 8/2002 | Stamps |
| 2002/0156398 A1 | 10/2002 | Mansy et al. |
| 2003/0150215 A1 | 8/2003 | Rollins |
| 2005/0013402 A1 | 1/2005 | Kriel |
| 2005/0074083 A1 | 4/2005 | Haasbroek et al. |
| 2007/0000250 A1 | 1/2007 | Chaki et al. |
| 2007/0064861 A1 * | 3/2007 | Sterbentz ................. G21C 3/02 376/409 |
| 2007/0217995 A1 | 9/2007 | Matsumura et al. |
| 2007/0280400 A1 | 12/2007 | Keller |
| 2007/0290178 A1 * | 12/2007 | Baron ................... C01G 43/003 252/643 |
| 2008/0144762 A1 * | 6/2008 | Holden ................... C22C 16/00 376/416 |
| 2008/0240334 A1 * | 10/2008 | Senor ....................... G21C 3/02 376/416 |
| 2009/0022259 A1 * | 1/2009 | Gray ...................... G21C 3/324 376/416 |
| 2009/0080586 A1 * | 3/2009 | Yokoyama ............... G21C 1/02 376/221 |
| 2009/0200691 A1 * | 8/2009 | Sornay ................... G21C 21/02 264/0.5 |
| 2009/0324953 A1 * | 12/2009 | Spino ..................... G21C 21/02 428/402 |
| 2010/0008463 A1 | 1/2010 | Inatomi et al. |
| 2010/0012288 A1 | 1/2010 | Marsden et al. |
| 2010/0239060 A1 | 9/2010 | Horie et al. |
| 2010/0303193 A1 * | 12/2010 | Walters ..................... G21C 3/02 376/412 |
| 2011/0194666 A1 * | 8/2011 | Walters ..................... G21C 3/04 376/416 |
| 2011/0194667 A1 | 8/2011 | Mariani |
| 2011/0206173 A1 * | 8/2011 | Walters ..................... G21C 1/02 376/264 |
| 2011/0285040 A1 * | 11/2011 | Heit ........................ G21C 3/42 264/0.5 |
| 2011/0317794 A1 * | 12/2011 | Venneri ................. G21C 3/328 376/170 |
| 2012/0140867 A1 * | 6/2012 | Venneri ................... G21C 3/20 376/414 |
| 2012/0207261 A1 | 8/2012 | Noel |
| 2012/0228788 A1 * | 9/2012 | Jankowiak ............. G21C 3/623 264/0.5 |
| 2012/0257707 A1 * | 10/2012 | Ahlfeld ................... G21C 3/16 264/0.5 |
| 2012/0321031 A1 * | 12/2012 | Ravenet .................. G21C 3/06 376/412 |

(56) References Cited

U.S. PATENT DOCUMENTS

| | | | |
|---|---|---|---|
| 2013/0010914 A1* | 1/2013 | Garnier | G21C 3/02 264/0.5 |
| 2013/0077731 A1* | 3/2013 | Sherwood | G21C 3/07 376/417 |
| 2013/0170603 A1 | 7/2013 | Baek et al. | |
| 2013/0264726 A1* | 10/2013 | Wallenius | G21C 3/62 264/0.5 |
| 2014/0053560 A1 | 2/2014 | Simpkin | |
| 2014/0064432 A1 | 3/2014 | Walters | |
| 2014/0183765 A1* | 7/2014 | Solomon | C04B 35/51 264/0.5 |
| 2014/0185730 A1* | 7/2014 | Kim | G21C 3/58 264/0.5 |
| 2014/0270043 A1 | 9/2014 | Lehnert et al. | |
| 2014/0321590 A1 | 10/2014 | Walters | |
| 2015/0170767 A1* | 6/2015 | Venneri | G21C 3/58 376/419 |
| 2015/0185716 A1 | 7/2015 | Wichmann et al. | |
| 2015/0221398 A1* | 8/2015 | Subhash | G21C 21/02 376/409 |
| 2015/0243378 A1 | 8/2015 | Walters | |
| 2015/0294747 A1 | 10/2015 | Walters | |
| 2016/0053391 A1 | 2/2016 | Loewen et al. | |
| 2016/0208659 A1 | 7/2016 | Stewart et al. | |
| 2016/0217876 A1 | 7/2016 | Walters | |
| 2017/0352443 A1 | 12/2017 | Walters | |

FOREIGN PATENT DOCUMENTS

| | | |
|---|---|---|
| GB | 1206776 | 9/1970 |
| GB | 2234849 A | 2/1991 |
| JP | S50-152097 | 12/1975 |
| JP | S53-134189 | 11/1978 |
| JP | S 54-33991 | 3/1979 |
| JP | S55-101894 | 8/1980 |
| JP | S 57-184510 | 11/1982 |
| JP | S 59-83082 | 5/1984 |
| JP | S 59-087696 | 6/1984 |
| JP | S 59-87696 | 6/1984 |
| JP | S59-185692 | 12/1984 |
| JP | 60181694 | 9/1985 |
| JP | S 62-207995 | 9/1987 |
| JP | S 63-3292 | 1/1988 |
| JP | S 63-73191 | 4/1988 |
| JP | S6473290 | 3/1989 |
| JP | H01-187493 A | 7/1989 |
| JP | 2-184792 | 7/1990 |
| JP | H 03-075591 | 3/1991 |
| JP | H04216492 A | 8/1992 |
| JP | H 04-270992 | 9/1992 |
| JP | H 05-34479 | 2/1993 |
| JP | H0552979 A | 3/1993 |
| JP | H 05-180968 | 7/1993 |
| JP | 6-194477 | 7/1994 |
| JP | H 06-324169 | 11/1994 |
| JP | 7-294676 | 11/1995 |
| JP | 9033687 | 2/1997 |
| JP | 9043389 | 2/1997 |
| JP | 9043321 | 2/1997 |
| JP | 9119994 | 5/1997 |
| JP | H09-119994 | 5/1997 |
| JP | H 09-251088 | 9/1997 |
| JP | H 10-170677 | 6/1998 |
| JP | H 10-319169 | 12/1998 |
| JP | H 11-326571 | 11/1999 |
| JP | 2002-131459 | 5/2002 |
| JP | 2002-181976 | 6/2002 |
| JP | 2004-101199 | 4/2004 |
| JP | 2005-232522 | 9/2005 |
| JP | 2006-030001 | 2/2006 |
| JP | 2006-226905 | 8/2006 |
| JP | 2006-284429 A | 10/2006 |
| JP | 2006-328260 A | 12/2006 |
| JP | 2007-291869 | 11/2007 |
| JP | 2008170252 | 7/2008 |
| JP | 2009074960 | 4/2009 |
| JP | 2010019793 | 1/2010 |
| JP | 5014318 B2 | 8/2012 |
| JP | 2012-529051 A | 11/2012 |
| JP | 2013-517479 A | 5/2013 |
| JP | 2013-520657 | 6/2013 |
| RU | 2124767 C1 | 1/1999 |
| RU | 2244347 C2 | 1/2005 |
| RU | 2011154565 | 7/2013 |
| SU | 714505 A1 | 2/1980 |
| SU | 1764783 | 9/1992 |
| WO | WO-2010/141218 | 12/2010 |
| WO | WO-2011/088116 | 7/2011 |
| WO | WO-2011/142869 | 11/2011 |
| WO | WO-2012/138972 | 10/2012 |
| WO | WO-2014/039641 | 3/2014 |
| WO | WO-2015/160571 | 10/2015 |
| WO | WO-2016/122963 | 8/2016 |
| WO | WO-2018/075096 | 4/2018 |
| WO | WO-2018/107170 | 6/2018 |

OTHER PUBLICATIONS

U.S. Appl. No. 61/979,206, Apr. 14, 2014, Advanced Reactor Concepts LLC.
U.S. Appl. No. 62/108,933, Jan. 28, 2015, Advanced Reactor Concepts LLC.
PCT/US15/24714, Apr. 7, 2015, Advanced Reactor Concepts LLC.
PCT/US2010/035412, May 19, 2010, Advanced Reactor Concepts LLC.
PCT/US2011/020981, Jan. 12, 2011, Advanced Reactor Concepts LLC.
PCT/US2011/025455, Feb. 18, 2011, Advanced Reactor Concepts LLC.
Final Office Action in re: U.S. Appl. No. 12/696,851, dated Jun. 6, 2013, 8 pages.
Final Office Action in re: U.S. Appl. No. 13/004,974, dated Mar. 13, 2014, 5 pages.
Notice of Allowance in re: U.S. Appl. No. 12/696,851, dated Aug. 22, 2013, 6 pages.
Notice of Allowance in re: U.S. Appl. No. 13/030,740, dated Mar. 14, 2014, 9 pages.
Office Action in re: U.S. Appl. No. 12/696,851, dated Dec. 21, 2012, 9 pages.
Office Action in re: U.S. Appl. No. 13/004,974, dated Aug. 23, 2013, 9 pages.
Office Action in re: U.S. Appl. No. 13/030,740, dated Sep. 20, 2013, 5 pages.
Requirement for Restriction/Election in re: U.S. Appl. No. 12/696,851, dated Aug. 29, 2012, 9 pages.
"Innovative small and medium sized reactors: Design features, safety approaches and R&D trends," International Atomic Energy Agency, [online], May 2005, pp. 1-214 [retrieved on Nov. 11, 2011) Retrieved from the Internet: <URL:http://www-pub.iaea.org/MTCD/publications/PDF/te.sub.--1451.sub.--web.pdf- >.
Cha et al., "Development of a Supercritical CO2 Brayton Energy Conversion System Coupled with a Sodium Cooled Fast Reactor," Nuclear Engineering and Technology, [online] Oct. 2009: 41(8), pp. 1025-1044 [retrieved on Nov. 11, 2011] Retrieved from theInternet: <URL:http://article.nuclear.or.kr/jknsfile/v41/JK0411 025.pdf>.
Chang et al., "Small Modular Fast Reactor Design Description," Argonne National Laboratory, Jul. 2005, 194 pages.
Emelaynov I.Ya. et al, "Designing nuclear reactors," Moscow, Energoisdat, 1982, p. 180. English Language translation provided.
Gol'din et al. "Project of Active Zone for the Reactor of BN-800 Type Operating Without of the Reactivity Margin Under Non-Intensive Control During Long Time," Math. Modelling, 2009; 21(10), pp. 76-84. English Language translation included.
Herrmann, et al, "Electrolytic Reduction of Spent Nuclear Oxide Fuel as Part of an Integral Process to Separate and Recover Actinides from Fission Products", Separation Science and Technology 41, pp. 1965-1983, (2006).
International Search Report and Written Opinion for related application PCT/US10/35412, dated Aug. 31, 2010.

(56) References Cited

OTHER PUBLICATIONS

International Search Report and Written Opinion for related application PCT/US15/24714, dated Jul. 13, 2015.
International Search Report and Written Opinion for related application PCT/US2011/020981, dated Mar. 23, 2011.
International Search Report and Written Opinion for related International Application No. PCT/US2011/025455, dated Nov. 25, 2011, 11 pages.
Kadak et al., "Nuclear Power Plant Design Project: A Response to the Environmental and Economic Challenge of Global Warming Phase 1 Review of Options & Selection of Technology of Choice," Massachusetts Institute of Technology Independent ActivitiesPeriod, [online], Jan. 1998, 56 pages [retrieved on Nov. 10, 2011] Retrieved from the Internet: <URL:http://web.mit.edu/pebble-bed/background.pdf>.
Kosaka, et al, "A Study on Fission Products Removal by the Dry Pyrochemical Technique for the Fuel Decladding, "Proceedings of Global 2005, paper 199, Tsukuba, Japan, Oct. 2005.
Nuclear Power Technology Development, "Coordinated Research Project CRP 125001 Small Reactors without On-Site Refuelling (2004-2008)" International Atomic Energy Agency, [online], Updated on Oct. 15, 2008, pp. 1-12 [retrieved on Nov. 10, 2011].Retrieved from the Internet: <URL:http://www.iaea.org/NuclearPower/SMR/crpi25001.html.
Ogata, "Directions of Metal Fuel Development for Fast Reasctors," Proceedings of Global 2009, paper 9135, Paris, France, pp. 1456-1464; Sep. 6-11, 2009.
Song el al, "Fractional Release Behavior of Volatile and Semivolatile Fission Products During a Voloxidation and OREOX Treatment of Spent PWR Fuel", Nuclear Technology, vol. 162, pp. 158-168, May 2008.
Thomas, "AIROX Nuclear Fuel Recycling and Waste Management", Proceedings, Global 93, vol. 2, pp. 723-728, Seattle WA, Sep. 1993.
Office Action in re: U.S. Appl. No. 14/291,890, dated Dec. 22, 2015, 5 pages.
U.S. Appl. No. 14/682,759, Office Action dated Dec. 15, 2016.
U.S. Appl. No. 14/035,392, Office Action dated Jun. 7, 2017.
U.S. Appl. No. 14/035,392, Office Action dated Nov. 29, 2016.
U.S. Appl. No. 14/291,890, Notice of Allowance dated Dec. 22, 2016.
U.S. Appl. No. 14/682,759, Final Office Action dated Jul. 27, 2017.
U.S. Appl. No. 15/003,329, Office Action dated Aug. 24, 2017.
Appleby, "Power Reactor Designs", BNWL-936 vol. 2, UC-80, Jan. 1969.
Hub et al., "Feasibility Study of Nuclear Steam Supply System Using 10,000-MW, Sodium-Cooled Breeder Reactor", ANL-7183, pp. 1-210, Sep. 1966.
Sehgal, Thorium-Based Fuels in Fast Breeder Reactors, Nuclear Technology, vol. 35, Oct. 1977, pp. 635-650.
Vitti et al., "Design of Prototype Carbide Subassemblies and an Evaluation of Proof-Testing Planse in the FFTF," Nuclear Technology, vol. 26, 1975.
U.S. Appl. No. 15/003,329, Office Action dated Jan. 29, 2018.
Baker, "Graphical Methods in Linear Programming," Optimization Modeling with Spreadsheets, Second Edition, 2011, [online]. <URL:http://onlinelibrary.wiley.com/doi/10.1002/9780470949108.app2/pdf>.
IBM Knowledge Center—Blending problems, 2006, [online], [retrieved on Jan. 22, 2018]. <URL: https://www.ibm.com/support/knowledgecenter/en/SS6MYV_3.4.0/ilog.odms.ide.odme.help/Content/Optimization/Documentation/ODME/_pubskel/ODME_pubskels/startall_ODME34_Eclipse1780.html>.
International Search Report and Written Opinion for International Application No. PCT/US2017/036010, dated Mar. 30, 2018.
International Serach Report and Written Opinion issued in International Application No. PCT/US2017/065634, dated Mar. 13, 2018.
Schreiber et al., "Integrated software package for nuclear material safeguards in a MOX fuel production facility," International Atomic Energy Agency, May 1999, [online], [retrieved on Jan. 21, 2018]. <URL: http://www.iaea.org/inis/collection/NCLCollectionStore/_Public/31/062/31062333.pdf>.
U.S. Appl. No. 15/003,329, Final Office Action dated Nov. 2, 2018.
U.S. Appl. No. 15/583,838, Requirement for Restriction/Election dated Jan. 23, 2019.
U.S. Appl. No. 15/614,536, Office Action dated Dec. 12, 2018.
Hejzlar et al., "Annular fuel for high-power-density pressurized water reactors: motivation and overview," Nuclear Technology, 2007; 160(1): pp. 2-15.
Kang, "Power uprates in nuclear power plants: international experiences and approaches for implementation," Nuclear Engineering and Technology, 2008; 40(4): pp. 255-268.
Miller et al., "Improving Nuclear Power Plant's Operational Efficiencies in the USA," Mechanical Engineering, 2011; pp. 47-52.
Raheja et al., "Impact of power uprate on environmental qualification of equipment in nuclear power plants," IEEE, 1997; pp. 974-978.
Tokiwai et al., "Development of Fabrication Technology of Metallic Fuel by Injection Casting," Journal of Nuclear Science and Technology, 2002; 39(3): pp. 910-912.
Wang Zhongyi et al., "E high-temperature nuclear power plant," 2010, p. 1-4 (abstract). Translation of relevant paragraphs provided.
Zhimin et al., "Management of Radioactive Wastes in a Nuclear Fuel Circulation System," China Nuclear Energy Association, 2008 Forum of Sustainable Development of China Nuclear Energy, p. 300-304. Translation of relevant paragraphs provided.

\* cited by examiner

CERAMIC NUCLEAR FUEL DISPERSED IN A METALLIC ALLOY MATRIX

RELATED APPLICATIONS

This application claims priority to U.S. Provisional Application No. 61/979,260, filed Apr. 14, 2014, all of which is incorporated herein by reference in its entirety.

TECHNICAL FIELD OF THE INVENTION

The present invention is related to nuclear fuels, and, more particularly, to metallic nuclear fuels.

BACKGROUND OF THE INVENTION

World electricity demand is expected to as much as double by 2030 and quadruple by 2050. The world electricity demand increase is forecasted to come from developed countries and, to an even larger extent, developing countries. To meet this rapid growth in demand, nuclear power may be a realistic, cost-effective energy source.

Increased energy supply from other sources, such as contribution from natural gas powered generation may be constrained by high and volatile gas prices, greenhouse gas emissions, and concerns over longer-term dependence on unstable sources of supply. Meanwhile, forms of alternative energy (solar, wind, biomass, hydroelectric, etc.) may be useful in satisfying some of the increased demand. They do not, however, scale sufficiently and cannot provide enough additional electric generating capacity in most markets to meet any significant part of the new electricity demand.

Coal power plants may provide some additional supply, but burning mass quantities of coal presents serious political obstacles given the negative environmental impacts.

Conventional nuclear power plants may also meet part of the added demand. Conventional nuclear power plants, however, have numerous technological and public acceptance obstacles to overcome. New types of nuclear fuels may also be required.

Certain fast reactor based power plants may have a 20-year refueling interval supported by a closed fuel cycle based on pyrometallurgical recycle technology. A metallic alloy fuel form of uranium (U)/plutonium (Pu)/zirconium (Zr) composition or enriched U/Zr composition for the initial core loading may be used. A remote injection casting process may be employed to fabricate the fuel pins. A very extensive irradiation data base exists for the fuel steady state, transient, and safety performance. The ternary alloy recycle pins may be highly radioactive and technology for their manufacture using remote operations behind shielding at temperatures of 1500-1600° C. is well established.

DETAILED DESCRIPTION OF THE PREFERRED EMBODIMENTS

Embodiments of the present invention may include methods for fabrication of metal nuclear fuels which incorporate ceramic particles. In certain embodiments, the ceramic particles may include crushed light water reactor (LWR) spent nuclear fuel (SNF). In certain embodiments, the ceramic particles may include thorium oxide and/or americium oxide. In certain embodiments, materials from spent reactor fuels can be added to the alloy mix. For example, ceramic particles, such as light water reactor spent nuclear fuel, may be crushed and dispersed in a metal alloy matrix.

U.S. Pat. No. 8,571,167, U.S. Publication No. 2011/0194666, and U.S. Publication No. 2011/0206173 are each hereby incorporated by reference in their entireties.

In certain embodiments, ceramic oxide LWR-SNF particles may be combined with metallic fast reactor fuel in any of the following three processes:

1. Bottom pour casting fuel slug. The SNR fuel particles may be added to the molten metallic fuel charge prior to the bottom pore casting of an annular (or cylindrical) fuel slug. The charge may be induction heated with dual frequencies such that a change in frequency would provide mixing of the SNF particles within the melt.
2. Injection casting of a solid fuel slug. The SNF fuel particles may be added to the molten metallic fuel charge prior to the injection casting of solid-cylindrical fuel slugs. The charge would be heated as described in 1.
3. Powder metallurgical process. The SNF fuel particles may be combined (blended) with metallic fuel particles that were fabricated by a powder metallurgical process.

The maximum quantity of SNF fuel particles that can be added to the metallic fuel must yield a continuous matrix of metal fuel.

After a short irradiation period, the microstructure of the fuel may be identical, substantively identical, and/or functionally identical to that of injection cast fuel, without crushed ceramic particles, irrespective of which of the fabrication processes was used. Thus, the extensive database of injection cast fuel, without SNF particles, may be an excellent indicator of expected irradiation performance.

The details of the process and the attributes of each process for producing fuel rods are described below. Each of the processes may contribute to the solution of the SNF problem by incinerating the transuranics over multiple recycles and they all may denature Pu239 in the process. In certain embodiments, fuel rods may be produced using reprocessed metallic fuels.

Bottom Pour Casting

In certain systems, bottom pour casting techniques may be used to produce a slug for insertion into a steel clad fuel pin. The slug may be an annular, zirconium (Zr)-sheathed slug. Upon irradiation the as-fabricated pin may rapidly restructure into the traditional morphology produced by original injection casting fabrication processes such that the existing, extensive performance databases for such fuel pins continue to apply.

While the following discussion relates to an exemplary embodiment to create an annular fuel pin, it is understood that bottom pour casting may be used to create any of a variety of fuel pins, including cylindrical or other shape fuel pins.

The feedstocks for an annular fuel pin may be charged into a bottom pour crucible and may be melted in an induction furnace. Melt times, temperatures, pressures, and other operating conditions may be selected based on the input feedstocks. The feedstocks may be selected to yield the desired composition of metallic uranium (U) and transuranics plus molybdenum (Mo), and/or zirconium (Zr). In certain embodiments, the feedstocks may include, for example, uranium, zirconium, transuranics, reprocessed metal fuel, and combinations thereof. In certain embodiments, preformed, thin-walled zirconium tubes may be snugly inserted into tight-fitted holes in a graphite mold. A rod may be positioned centrally in the hole in the graphite mold. The plug in the bottom of the crucible may be raised whereupon the metallic alloy melt may flow into the mold and solidify.

In this way an annular fuel pin slug, radially enclosed in a Zr sheath in certain embodiments, may be produced. The annular fuel pin slug may be removed from the mold and inserted into a tight-fitting steel cladding. End caps may be welded on. A bundle of such pins may be assembled into a multi-pin fuel assembly.

In certain embodiments, a charge of crushed up ceramic particles may be added to the melt after the metal melt has become molten. The frequency of the induction furnace may be tuned so as to create a roiling flow regime of the molten metal. The roiling flow regimen may serve to mix the ceramic particles homogeneously into the molten metal phase. Induction heating of uranium (U)/plutonium (Pu)/zirconium (Zr) and uranium (U)/zirconium (Zr) is known from current injection casting processes as is the ability to establish roiling flow regimes by adjustments of frequency.

After a time period, the roiling may be halted. Time periods for roiling may be selected to achieve homogenous or nearly homogenous mixing of the mixture. The bottom pour may be conducted as described above.

Freezing, preferably rapid freezing, of the mix may prevent re-segregation of the lower-density ceramic from the metal phase. Freezing times and temperatures may be selected to prevent re-segregation.

The resulting fuel slug may be a Zr-sheathed annular slug of a cermet composition where the fissile bearing metallic alloy forms a continuous matrix and most of the fissile mass resides in the metal phase. The metal fuel to ceramic ratio may be chosen such that upon irradiation, the fuel pin generates a continuous matrix of metal fuel to ensure adequate thermal conductivity. In certain embodiments, the dispersed ceramic particles may include a composition having over approximately 90% uranium oxide with approximately 6% fission products and approximately 1.5% transuranics. These casting operations can be performed remotely, as is typically required when working with light water reactor spent nuclear fuel.

There are numerous potential operational benefits of annular fuel forms, and adding the ability to manage spent nuclear fuel may be an additional benefit.

Injection Casting

In certain systems, known injection casting techniques have been used to produce a solid (i.e. non-annular) slug for insertion into a steel clad fuel pin. The slug may be a solid fuel slug that is inserted into a loose-fitting steel cladding and sodium bonded to attain good thermal conductivity between slug and cladding Upon irradiation the as-fabricated pin may rapidly restructure into the traditional, fission gas filled porous morphology produced by the injection casting fabrication processes for which the existing, extensive performance databases apply.

In certain embodiments, injection casting methods may be modified to incorporate ceramic particulates, such as crushed light water reactor spent nuclear fuel, into metal fuel pins. The feedstocks for a fuel pin may be charged into a crucible and may be melted in an induction furnace. The feedstocks may be selected to yield the desired composition of metallic uranium (U), transuranics, and/or zirconium (Zr).

In certain embodiments, a charge of crushed up ceramic particles may be added to a melt after the metal melt has become molten. The frequency of the induction furnace may be tuned so as to create a roiling flow regime of the molten metal. The roiling flow regimen may serve to mix the ceramic particles homogeneously into the metal phase.

After a time period, the roiling may be halted. Time periods for roiling may be selected to achieve homogenous or nearly homogenous mixing of the mixture. An injection molding process may be performed for forcing the melt into molds Freezing, preferably rapid freezing, of the mix within the mold may prevent re-segregation of the lower-density ceramic from the metal phase. Freezing times and temperatures may be selected to prevent re-segregation.

The resulting fuel slug may be a solid fuel pin of a cermet composition where the fissile bearing metallic matrix exceeds roughly 50 vol % and most of the fissile mass resides in the metal phase. The metal fuel to ceramic ratio may be chosen such that upon irradiation, the fuel pin generates a continuous, fission gas impregnated matrix of metal fuel to ensure adequate thermal conductivity. In certain embodiments, the dispersed ceramic particles may include a composition of over approximately 90% uranium oxide with approximately 6% fission products and approximately 1.5% transuranics. These injection casting operations can be performed remotely, as is typically required when working with light water reactor spent nuclear fuel.

Powder Fuel Metallurgy

Powder metallurgy may facilitate the manufacture of cermet fuel compositions wherein ceramic particles can be embedded into the metallic phase matrix. This capability, just like the bottom-pour and the injection casting cermet fuel pin fabrication manufacturing methods, may allow for the option to crush up ceramic fuel, such as light water reactor spent nuclear fuel, and introduce the crushed ceramic fuel into a closed fuel cycle supporting fast reactor based power plants. This may provide an effective approach to manage the difficult light water reactor spent nuclear fuel disposition problem. By constraining the volume fraction of the ceramic phase, it may be possible to retain the applicability of the previous fuel performance databases.

Fuel Characteristics

In all three embodiments, there may be bounds on ceramic volume fractions that must be enforced to maintain applicability of the prior databases related to metal fuels and to maintain acceptable ranges of thermal conductivity and to attain necessary levels of fissile density. For an initial fuel loading of enriched U/Zr, the ceramic volume fraction may be such that a continuous metal matrix exists. For the recycle fuel loadings of U/Pu/Zr the ceramic weight fraction may be approximately 10 weight % (just sufficient to restore the burned out heavy metal weight fraction).

The already-established methods for crushing up light water reactor spent nuclear fuel, capturing released gaseous fission products, and tailoring particle size distributions are known. Particle sizes may average between approximately 1 to approximately 100 microns. A homogeneous distribution of ceramic particles in the as-cast pin may be relevant considerations for the present disclosure.

As regards wetting, a small quantity of ceramic inclusions due to impurities are traditionally found in the fuel pins that were manufactured by the current injection casting manufacture processes. Wetting may be achieved through these processes.

As regards to particle clumping, even if clumping of ceramic particles during fabrication were to occur, some degree of clumping may not significantly degrade incore performance because creating a high fissile density "hot spot" in the fuel by particle clumping cannot happen because enrichment in the light water reactor spent nuclear fuel particles may be approximately 1 to 2% whereas in the metallic matrix it may be greater than approximately 10%. Clumping might create a local "cool spot", which presents no performance problem. Even if the fabrication process produces less than perfect homogenization, no hot spot issues may arise.

Furthermore, incore swelling may not lead to particle clumping. During the first approximately 1 to 1.5% of incore burnup, microbubbles of fission gas may form and cause the ductile metallic phase matrix to flow into the approximately 25% free volume. The free volume exists in the central hole for the annular pin, the gap between the fuel slug and the cladding for the injection cast pin, and the open porosity in the powder metallurgical produced fuel. The flow of the metal matrix may carry the embedded ceramic particles with it such that the mean separation distance between particles increases. No clumping may be induced.

The ceramic particles may be predominantly U238. U238 may be the source of negative Doppler reactivity feedback in a rising power transient. In some reactor designs, the thermal time constant of the low-thermal-conductivity ceramic particles may retard the promptness of the negative reactivity feedback. The effect on other classes of fast reactor transient performance, however, may be negligible for several reasons. First, Doppler may not be a dominant reactivity feedback in those (small) fast reactors. Radial thermal expansion may dominate instead. Second, in recycle loadings more than approximately 80% of U238 (more than approximately 65% in the initial fuel charge) may reside in the metal phase matrix of the cermet fuel where thermal heating may be instantaneous or near-instantaneous. The prompt feedback from the metal phase may dominate the slightly-delayed feedback from the ceramic phase. Additionally, the ceramic particles may be very small, from approximately one to approximately several hundred microns, and may be well bonded to the surrounding metal phase. Therefore, the thermal time delay of the ceramic particles may be quite small.

Safeguards and Nonproliferation Benefits

The introduction of crushed light water reactor spent nuclear fuel particles into the metal alloy fuel pins may provide nonproliferation benefits. This benefit may be especially advantageous for the first core loading of under 20% enriched uranium and having no transuranics (which by itself is non-radioactive). For the initial core, after irradiation, the resultant fuel composition may include plutonium rich in Pu239 but lack substantial contamination with Pu240 and 241, whereas to the contrary recycle cores may exhibit a mix of plutonium isotopes that is unattractive for weapons use. So adding crushed LWR SNF to the initial loading can offer several nonproliferation benefits.

First, the oxide particles from crushed light water reactor spent nuclear fuel contain fission products that provide a radiation field to self-protect the initial core charge, which is initially non-radioactive metallic alloy enriched uranium U/Zr, fresh fuel, unprotected by a radiation field during shipment to the reactor.

Importantly, the ceramic particles may contain Pu240 and 241 isotopes. The particle size may be small enough and the fuel temperature may be high enough that under incore radiation bombardment, significant migration of isotopes may take place across all particle/matrix interfaces. Thus, Pu240 and 241 atoms may enter the metal matrix and may intimately mix with freshly bred Pu239 in the metal matrix and visa-versa. (Any oxygen migrating to the metal phase may be 'gettered' by the Zr.) Therefore, after only a brief exposure in the reactor, the newly-bred Pu239 may have become contaminated with Pu240 and 241, making it unattractive for use in nuclear weapons.

The "denaturing" with Pu240 and 241 in the initial core loading may be significant because in that initial load the ceramic volume fraction may approach approximately 50%, with a heavy metal weight fraction of approximately 35%. In light water reactor spent nuclear fuel, the plutonium weight fraction is approximately 1.5% and the plutonium weight fraction and (240+241)/(239+240+241) isotopic contamination of Pu239 may be approximately 40%. Whereas the corresponding fast reactor asymptotic composition ratio, attained after multiple recycles, may be approximately 25%.

After the first 20-year irradiation campaign attaining approximately 8 atom % burnup, the initial fuel charge may have progressed approximately 10% of the way from the fissile composition being all U235 to being all Pu. The Pu239 composition may evolve from being rich in 239 toward displaying the asymptotic (240+241) contamination of the Pu239.

After the first 20-year irradiation campaign, the initial fuel charge in the metallic phase may contribute, for example, (100−35 wt % of fuel)×(13 wt % fissile in fuel)×($\frac{1}{10}$ Pu in the fissile)=0.00845 to the bred charge of Pu239 atoms in the fuel.

The ceramic may contribute, for example, (35 wt % of fuel)×(1.5% Pu in the fuel)×(40% 240+241 in the Pu)=0.0021 to the charge of (240+241) atoms for each atom of Pu in the fuel.

Therefore, if thorough mixing takes place, the (240+241)/(239+240+241) ratio of the cermet fuel at discharge may be around, for example, (0.0021)/(0.00845+0.0021)=0.199. This may be considered to be already as denatured as the asymptotic number. Isotopic mixing may take place in light of the temperature and temperature gradient in the fuel pins, the intense radiation field, and the duration of exposure to these conditions. Isotope migration across the ceramic/metal interface may create homogeneous mixing with the bred Pu239. As such, significant intrinsic denaturing may be available even for the first fuel loading. The effect may diminish for the recycle fuel loadings because the ceramic weight fraction may be reduced to approximately 8-10 wt %, but by then the Pu may have already been denatured and the recycle fuel may be loaded with radioactive fission products retained in the recycle process.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A method of fabricating a cermet metal fuel matrix nuclear fuel pin, the method comprising:
   melting one or more metal nuclear fuel feedstocks in an induction furnace to create a molten metal melt;
   adding ceramic particles into the molten metal melt to create a mixture;
   stirring the mixture vigorously;
   bottom pouring the mixture into a mold;
   allowing the mixture to solidify in the mold to create a cermet metal fuel matrix nuclear fuel pin; and
   wherein the ceramic particles comprise a composition comprising approximately 90% uranium oxide or thorium oxide, approximately 6% fission products, and approximately 1.5% transuranics, which include americium oxide.

2. The method of claim 1, wherein the stirring comprises roiling of the mixture to attain a homogeneous distribution of particles wherein said roiling is produced from tuning of the frequency of the induction furnace.

3. The method of claim 1, wherein the mold comprises a cylindrical hole with a rod in the approximate center of the cylindrical hole.

4. The method of claim 3, wherein the resulting cermet metal fuel matrix nuclear fuel pin is an annular cermet metal fuel matrix nuclear fuel pin.

5. The method of claim 1, wherein mold comprises one or more zirconium tubes set snugly into the holes within the mold.

6. The method of claim 5, wherein the resulting fuel pin is a zirconium sheathed cermet metal fuel matrix nuclear fuel pin.

7. The method of claim 1, wherein the ceramic particle distribution within the cermet metal fuel matrix remains homogenous after allowing the mixture to solidify by rapid freezing.

8. The method of claim 1, wherein the one or more metal nuclear fuel feedstocks comprise uranium.

9. The method of claim 1, wherein the one or more metal nuclear fuel feedstocks comprise (i) uranium, and (ii) zirconium or molybdenum.

10. The method of claim 1, wherein the one or more metal nuclear fuel feedstocks comprises mixtures of: uranium and transuranics.

11. A method of fabricating a cermet metal fuel matrix nuclear fuel pin, the method comprising:
    melting one or more metal nuclear fuel feedstocks in an induction furnace to create a molten metal melt;
    adding ceramic particles into the molten metal melt to create a mixture;
    stirring the mixture vigorously;
    injection casting the mixture into a mold; and
    wherein the ceramic particles comprise a starting composition comprising approximately 90% uranium oxide, approximately 6% fission products, and approximately 1.5% transuranics;
    allowing the mixture to solidify in the mold to create a cermet metal fuel matrix nuclear fuel pin.

12. The method of claim 11, wherein the stirring comprises roiling of the molten metal melt to attain uniform mixing of the ceramic particles into the molten metal melt wherein said roiling is produced from tuning of the frequency of the induction furnace.

13. The method of claim 11, wherein the allowing the mixture to solidify is by freezing.

14. The method of claim 11, wherein the one or more metal nuclear fuel feedstocks comprise uranium.

15. The method of claim 11, wherein the one or more metal nuclear fuel feedstocks comprise uranium and zirconium.

16. The method of claim 11, wherein the one or more metal nuclear fuel feedstocks comprises mixtures of: uranium and transuranics.

* * * * *